(12) United States Patent
Majewicz

(10) Patent No.: US 8,351,720 B2
(45) Date of Patent: Jan. 8, 2013

(54) METHOD AND SYSTEM PROVIDING EDGE ENHANCED IMAGE BINARIZATION

(75) Inventor: Peter Majewicz, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 782 days.

(21) Appl. No.: 12/257,474

(22) Filed: Oct. 24, 2008

(65) Prior Publication Data
US 2009/0268973 A1    Oct. 29, 2009

Related U.S. Application Data

(60) Provisional application No. 61/047,662, filed on Apr. 24, 2008.

(51) Int. Cl.
*G06K 9/36* (2006.01)

(52) U.S. Cl. ........................................................ 382/237

(58) Field of Classification Search .................... 382/237
See application file for complete search history.

(56) References Cited

U.S. PATENT DOCUMENTS

| | | | |
|---|---|---|---|
| 4,668,995 A | | 5/1987 | Chen et al. |
| 4,996,602 A | | 2/1991 | Ono et al. |
| 5,710,842 A | * | 1/1998 | Lee .............................. 382/283 |
| 5,870,503 A | | 2/1999 | Kumashiro |
| 5,889,885 A | | 3/1999 | Moed et al. |
| 6,351,566 B1 | | 2/2002 | Zlotnick |
| 6,393,150 B1 | | 5/2002 | Lee et al. |
| 2003/0137593 A1 | * | 7/2003 | Watanabe et al. ............. 348/274 |
| 2005/0180600 A1 | * | 8/2005 | Wu et al. ....................... 382/103 |
| 2007/0177825 A1 | * | 8/2007 | Suzuki et al. ................. 382/308 |
| 2010/0046034 A1 | * | 2/2010 | Nagarajan et al. ............ 358/2.1 |

OTHER PUBLICATIONS

Moon-Soo Chang et al., "Improved Binarization Algorithm for Document Image by Histogram and Edge Detection," IEEE ICDAR 95, vol. 2, Aug. 14-16, 1995, pp. 636-639.

Mehmet Sezgin et al., "Survey over image thresholding techniques and quantitative performance evaluation," J. Electron. Imaging, 13(1), Jan. 2004, pp. 146-165.

* cited by examiner

*Primary Examiner* — Bhavesh Mehta
*Assistant Examiner* — Nirav G Patel

(57) ABSTRACT

A method and imaging systems that process images employ image binarization. An image processing system includes a processor, a memory and a computer program stored in the memory and executed by the processor. A scanning system includes a scanner that scans an image source to produce a grayscale image and an image processor that includes a computer program. The respective computer programs include instructions that implement image binarization. The method of image binarization includes generating a solid fills binary image from a grayscale image and generating an edge enhanced binary image from the grayscale image. The method further includes combining the generated binary images to produce a composite binary image and providing the composite binary image as an output binary image.

20 Claims, 3 Drawing Sheets

METHOD AND SYSTEM PROVIDING EDGE ENHANCED IMAGE BINARIZATION

CROSS REFERENCE TO RELATED APPLICATIONS

This application claims the benefit of provisional patent application Ser. No. 61/047,662, filed Apr. 24, 2008; entitled "Method And System Providing Edge Enhanced Image Binarization" which application is incorporated by reference herein as if reproduced in full below.

BACKGROUND

Image binarization is used to transform a digital image such as a grayscale image into a binary image. Binary images in which pixels are represented by single bits are considerably more compact than grayscale images that may employ eight or more bits to represent each pixel. As such, binary images are attractive for applications that are one or both of memory limited and bandwidth limited. Examples of such applications include, but are not limited to, facsimile (FAX) transmission and certain document types of document scanning.

In general, image binarization may be divided into simple or low complexity methods and complex methods. High complexity methods are often too computationally costly for many applications. As such, many applications essentially require or are dependent upon the use of low complexity methods.

Simple or low complexity image binarization methodologies include global thresholding, error diffusion and various other halftoning techniques. For example, global thresholding may employ an arbitrarily chosen, fixed threshold to map pixel(s) in the grayscale image into a corresponding pixel of the binary image. Alternatively, global thresholding may employ an adaptive global threshold that is based on certain image statistics or on an analysis of a shape or other characteristics of an image histogram, for example. The adaptive global threshold essentially automates selection of the fixed threshold.

Unfortunately, many of the low complexity image binarization methods are targeted at producing good binary representations of either text/line content or natural scene content, but not both. These methodologies often prove insufficient for binarization of images with mixed content (e.g., text/lines and natural scenes). For example, a global threshold may be chosen that provides good natural scene representation but fails to render crisp lines and text in the binary image. On the other hand, image binarization methods that attempt to address mixed content images often either produce uniformly poor binary images or are overly complex and not well suited for many applications.

BRIEF DESCRIPTION OF THE DRAWINGS

The various features of embodiments of the present invention may be more readily understood with reference to the following detailed description taken in conjunction with the accompanying drawings, where like reference numerals designate like structural elements, and in which.

DETAILED DESCRIPTION

Figure 1:
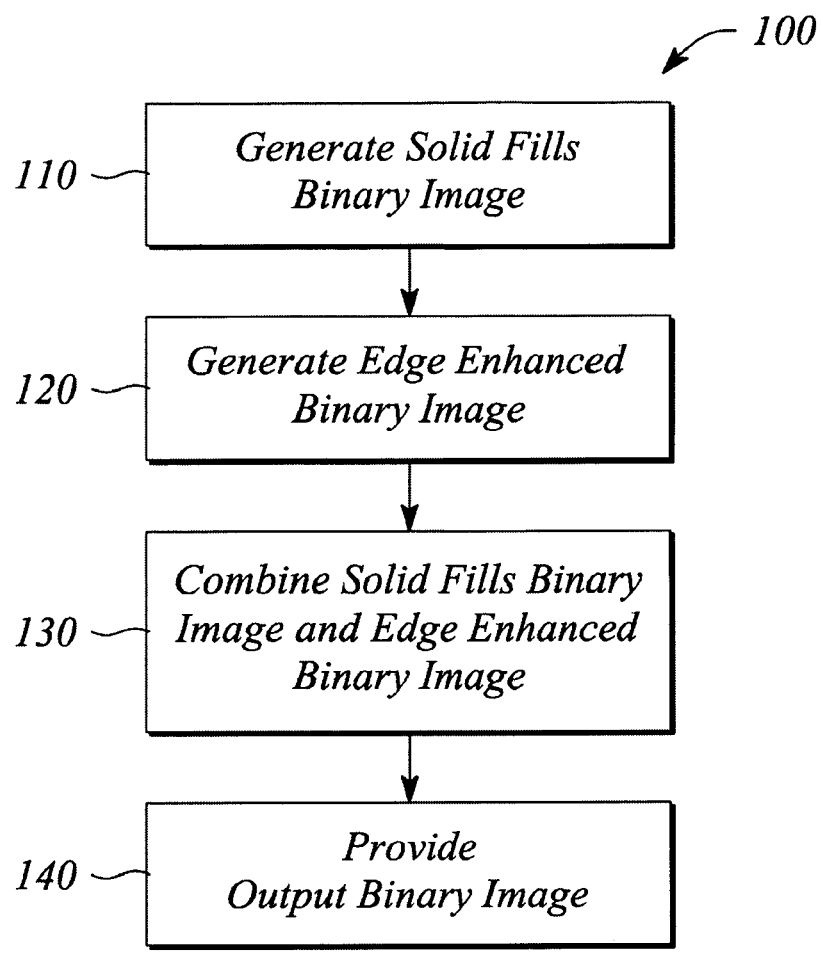
FIG. 1 illustrates a flow chart of a method of image binarization, according to an embodiment of the present invention.

Embodiments of the present invention facilitate conversion of a grayscale image into a binary image (i.e., image binarization). In particular, embodiments of the present invention provide image binarization of mixed content grayscale images comprising one or both of text/line content and natural scene content. The image binarization simultaneously preserves in the binary image both 'solid fills' content (e.g., image shading between edges) characteristic of natural scenes and lines or edges content typical of text/line content. As such, according to embodiments of the present invention, a binary image representation of the grayscale image may be produced having one or both of crisp clear text and sharp well-defined lines. At the same time, natural scene content of the original grayscale image is also reproduced in the binary image with relatively high fidelity, according to embodiments of the present invention.

The image binarization according to embodiments of the present invention is referred to as 'edge enhanced image binarization'. Edge enhanced image binarization of the embodiments generally involves only relatively low-complexity image processing operations. As such, the embodiments of the present invention provide image binarization that is generally well suited for applications having access to potentially limited image processing power including, but not limited to, personal computer (PC) software, embedded firmware applications (e.g., scanners) and various hardware-assisted image processing pipelines.

According to various embodiments, image binarization of a grayscale image generates a first binary image from the grayscale image that emphasizes solid fills content. The generated first binary image is referred to as a 'solid fills' binary image. Essentially, the solid fills image is generated by assigning either a 1 or a 0 to individual pixels of the binary image based on a criterion that focuses on filled regions of the grayscale image. In some embodiments, the solid fills image is generated according to a threshold comparison operation performed on the grayscale image. For example, if an intensity of a pixel in a grayscale image exceeds a particular threshold value (e.g., the intensity value exceeds the threshold), a corresponding pixel in the binary image may be assigned a value of 1 representing white, for example. Alternatively, if the threshold is not exceeded, then the corresponding pixel in the binary image is assigned a value of 0 representing black, for example. Herein, a correspondence of 1 with white and 0 with black is for discussion purposes only and not a limitation.

In some embodiments, the solid fills image is generated using a binarization based on relatively weak thresholding that emphasizes regions of the grayscale image that are relatively dark (e.g., solid or filled objects or shapes) compared to other regions. In general, relatively weak thresholding binarizes the grayscale image for a shallow gamma curve and provides good nature scene reproduction in the solid fills binary image as a result.

Among various approaches for generating the solid fills binary image are various relatively low-complexity and relatively high complexity binarization methods. The low complexity methods include, but are not limited to, rudimentary global threshold methods, globally adaptive threshold methods, and an error diffusion or another halftoning method. These techniques differ primarily in how a threshold is selected and then subsequently applied to the image. The relatively high complexity methods include, but are not limited to, foreground and background segmentation, object identification, and clustering. Essentially any method of mapping pixel intensity in the grayscale image to a binary representation that attempts to preserve overall natural scene information of the grayscale image may be employed according to various embodiments of the present invention.

For example, generating the solid fills binary image may comprise choosing a threshold according to a histogram of the grayscale image. Choosing a threshold may comprise generating an image histogram. Choosing a threshold may further comprise generating a cumulative histogram from the image histogram. The cumulative histogram may be used to determine an adaptive threshold based on a black clipping percentile and a white clipping percentile, for example.

Image binarization according to the embodiments of the present invention further generates a second binary image from the grayscale image in a manner that emphasizes edges and lines in the original grayscale image. The second binary image is referred to as an 'edge enhanced binary image' and essentially represents an 'edge map' of the original grayscale image. In some embodiments, the edge enhanced binary image is generated by applying edge enhancement image processing to the original grayscale image. After edge enhancement, the image is converted to a binary image.

For example, a threshold-based image binarization may be employed to convert a result of edge enhancement into the edge enhanced binary image. Generation of the edge enhanced binary image and the solid fills binary image may be performed in parallel, according to some embodiments. In other embodiments, generating the edge enhanced binary image and generating the solid fills binary image are performed serially in a sequential manner. The order in which generating the edge enhanced binary image and generating the solid fills binary image are performed is unimportant since both operate on the grayscale image independently.

The solid fills binary image and the edge enhanced binary image are then combined to produce a composite binary image. Combining the images merges or overlays binary content of the solid fills binary image and the edge enhanced binary image. As such, the edge map and a threshold map of the original grayscale image are simultaneously presented in the binary image. In some embodiments, the images are combined using a logical OR (i.e., p OR q=1 for all {p, q} except p=q=0 where p OR q=0). In some of these embodiments, the logical OR is performed on a pixel-by-pixel basis. In some embodiments, the composite image is further filtered to remove noise introduced by the binarization to yield a final output binary image. For example, speckle removal may be used to filter the combined image to yield the final output binary image.

As used herein, the term 'natural scene' is defined and employed to mean image content derived from photographs or similar sources. In particular, natural scene is employed to mean image content that includes and employs shading or gradient (i.e., either color gradient or grayscale gradient) to represent image content. For example, a grayscale photograph of a mountain scene or a person would be a natural scene, as defined herein. Similarly, a chart or graph that used shades of gray to represent information content would be a natural scene. In contrast, reference to one or both of text content and line content (e.g., text/line content) is defined as content that has sharp or crisp edges between highly contrasting colors or grayscale levels. For example, a text character such as the letter 'A' on this page is represented by abrupt changes between a white background and a black foreground and does not depend or benefit from any shading. Moreover the letter 'A' generally has a high degree of linear content. That is, the abrupt change from white to black generally occurs along a well defined linear boundary. The term 'mixed content' refers to images containing a mixture of text/line content and natural scene content. An example of a mixed content grayscale image is an image that contains a photograph (e.g., a photograph of a tree) and text (e.g., a caption below the photograph).

A 'grayscale' image is defined as a digital image that is represented by an array of pixels, each pixel being represented by a number that indicates a gray level (e.g., darkness or lightness) of the pixel. The number may be represented by a binary number having b bits. The number of bits b in the binary number representing the pixel of a grayscale image is referred to as a 'bit depth'. For example, a grayscale image may have pixels represented by an 8-bit binary number (e.g., bit depth b=8). For such a grayscale image, the gray level or pixel value of each pixel may range from 0 to 255. Herein, the bit depth of a grayscale image is defined to be strictly greater than one (i.e., b>1).

A 'binary' image is defined herein as digital image having pixels that may be completely represented by either a 1 or a 0 (e.g., a single binary bit). For example, a pixel having a value of 1 may represent a black or foreground pixel while a pixel having a value of 0 may represent a white or background pixel. In another example, the pixel value of 1 may represent a white pixel while the pixel value of 0 may indicate a black pixel. In either case, the binary image has a bit depth b of exactly one (i.e., b=1).

Some digital images (e.g., color images) may employ more than one number to represent a pixel. However, all such digital images may be converted to a grayscale image. For example, a relative or average intensity of three hues of a given pixel (e.g., 3 numbers representing three primary colors that define a pixel color) may be mapped into a single number representing a gray level of the pixel to convert the color digital image into a grayscale image.

Herein, reference to a 'corresponding' pixel in an output image (e.g., binary image) is defined as a particular pixel in the output image that is one or more of created or otherwise related to a pixel(s) in an input image by virtue of an image processing operation performed on the input image. For example, an i-th pixel of the digital image may be mapped into an i-th pixel of the binary image by an image binarization. In this example, the i-th pixel of the binary image is the corresponding pixel to the i-th pixel in the digital image.

For simplicity herein, no distinction is made between a digital image and a grayscale image unless such a distinction is necessary for proper understanding. Further, as used herein, the article 'a' is intended to have its ordinary meaning in the patent arts, namely 'one or more'. For example, 'a grayscale image' generally means 'one or more grayscale images' and as such, 'the grayscale image' means 'the grayscale image(s)' herein. Also, any reference herein to 'top', 'bottom', 'upper', 'lower', 'up', 'down', 'left' or 'right' is not intended to be a limitation herein. Moreover, examples herein are intended to be illustrative only and are presented for discussion purposes and not by way of limitation.

FIG. 1 illustrates a flow chart of a method 100 of image binarization, according to an embodiment of the present invention. The method 100 of image binarization converts a grayscale image into a binary image. For example, the grayscale image may comprise pixels having values that range from 0 indicating black to 255 indicating white. The grayscale image is provided as an input to the method 100 of image binarization. The method 100 of image binarization produces the binary image as an output. In various embodiments, the binary image produced by the method 100 of image binarization is one or more of stored in a memory, displayed to a user, passed to another image processing operation and transmitted over a communication channel.

As illustrated in FIG. 1, the method 100 of image binarization comprises generating 110 a solid fills binary image from the grayscale image. Generating 110 a solid fills binary image generally preserves solid fill content of the grayscale image. In other words, the solid fills binary image emphasizes a difference between a background and a foreground of the grayscale image. For example, generating 110 a solid fills binary image that operates on a grayscale image may assign a value of 0 indicating black to pixels of the binary image that correspond to regions of the grayscale image that are relatively darker or more gray. Conversely, generating 110 a solid fills binary image operating on the grayscale image may assign a value of 1 indicating white to pixels of the binary image that correspond to regions of the grayscale image that are relatively lighter or less gray.

Figure 2:
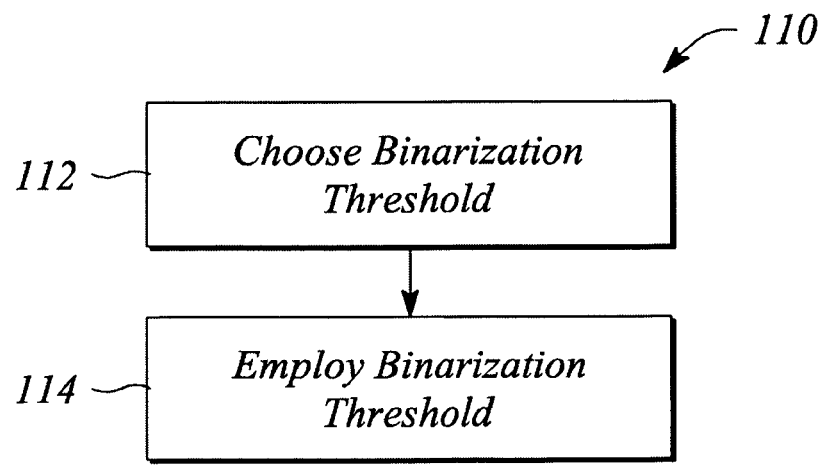
FIG. 2 illustrates a flow chart of generating a solid fills binary image of FIG. 1, according to an embodiment of the present invention.

FIG. 2 illustrates a flow chart of generating 110 a solid fills binary image of the method 100, according to an embodiment of the present invention. As illustrated, generating 110 a solid fills binary image comprises choosing 112 a binarization threshold. The binarization threshold 112 establishes means for separating or differentiating the relatively dark and the relatively light regions of the grayscale image. In such embodiments, generating 110 a solid fills binary image further comprises employing 114 the binarization threshold to convert the grayscale image into a binary image. Choosing 112 a binarization threshold establishes a level or decision point for assigning one of two binary values to each pixel in the solid fills binary image based on a value of one or more corresponding pixels in the grayscale image. For example, the binarization threshold may establish that a pixel in the binary image is assigned a value of 1 if a corresponding pixel in the grayscale image exceeds a value of 100. Employing 114 such a binarization threshold may comprise examining each pixel in the grayscale image, deciding whether or not the examined pixel exceeds the threshold, and assigning either a 0 (e.g., does not exceed the threshold) or a 1 (e.g., does exceed the threshold) to a corresponding pixel in the solid fills binary image.

Figure 3:
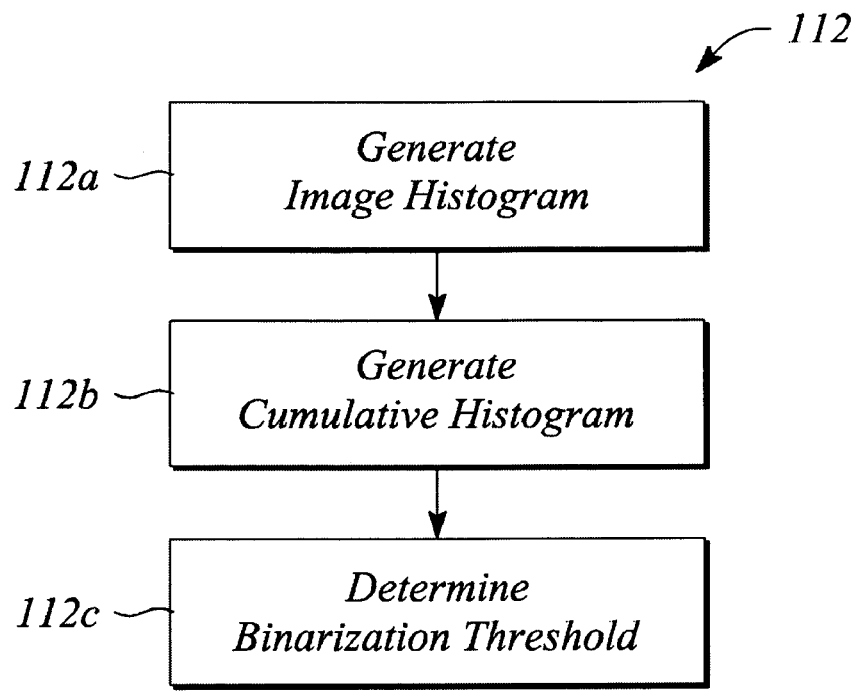
FIG. 3 illustrates a flow chart of choosing a binarization threshold of FIG. 2, according to an embodiment of the present invention.

FIG. 3 illustrates a flow chart of choosing 112 a binarization threshold of FIG. 2, according to an embodiment of the present invention. In particular, as illustrated, choosing 112 a binarization threshold determines an adaptive threshold using an image histogram and several arbitrarily determined percentile values. The determined adaptive threshold is a relatively weak threshold that facilitates binarization for a shallow gamma curve and provides good natural scene reproduction in the binary image after employing 114 the binarization threshold.

As illustrated in FIG. 3, choosing 112 a binarization threshold comprises generating 112a an image histogram from the grayscale image. Essentially any method of producing a histogram of an image may be employed in generating 112a an image histogram. For example, consider a grayscale image G having a height of m pixels and a width of n pixels, where m and n are integers. Individual pixels of the grayscale image G may be represented by a 2-dimensional (2D) array of gray level values $G_{p,q}$, where p and q are index integers corresponding to the height (m-direction) and width (n-direction), respectively. Equivalently and without loss of generality, the pixels in the grayscale image G may be indexed using an index integer i ranging from 0 to m·n−1 such that the grayscale image G is represented as a 1-dimensional (1D) array. For the grayscale image G, a gray level of an i-th pixel of the grayscale image G is denoted by $G_i$, for example. Further, if a bit depth of the grayscale image G is represented by an integer b, then the gray level $G_i$ of the i-th pixel will be a value between 0 and $2^b-1$. For this example, a pixel gray level $G_i$ of 0 denotes an object or foreground pixel (i.e., black) while a pixel gray level $G_i$ of $2^b-1$ is a background pixel (i.e., white).

An image histogram H for the image G may be generated 112a by defining a binary function $\delta(\cdot)$ in terms of arbitrary variables x and y given by $$\delta(x, y) = \begin{cases} 1, & x \equiv y \\ 0, & \text{otherwise} \end{cases} \quad (1)$$

The image histogram H represented by a histogram array $H_j$ indexed on an integer j is then given by $$H_j = \frac{1}{m \cdot n - 1} \sum_{i=0}^{m \cdot n - 1} \delta(G_i, j), \quad (2)$$

where $j \in [0, 1, 2, K, 2^b - 1]$

Referring again to FIG. 3, choosing 112 a binarization threshold further comprises generating 112b a cumulative histogram from the image histogram. An exemplary cumulative histogram C may be generated 112b as a cumulative histogram array $C_j$ from the histogram array $H_j$ according to $$C_j = \sum_{k=0}^{j} H_k, \quad (3)$$

Choosing 112 a binarization threshold further comprises determining 112c the binarization threshold from the cumulative image histogram. In some embodiments, the binarization threshold is determined 112c using a black clipping percentile $s_1$, a white clipping percentile $s_2$, and a first threshold $t_1$. The black clipping percentile $s_1$ and the white clipping percentile $s_2$, are arbitrarily chosen values between 0 and 100 (i.e., $0 \leq s_1, s_2 \leq 100$). The first threshold $t_1$ is also a percentile that is an arbitrarily chosen value between 0 and 100 (e.g., $0 \leq t_1 \leq 100$). Exemplary values for the first threshold $t_1$, the black clipping percentile $s_1$ and the white clipping percentile $s_2$ are respectively 13, 5 and 95 (i.e., $t_1=13$; $s_1=5$; $s_2=95$).

In some embodiments, determining 112c the binarization threshold comprises computing a second threshold $t_2$ according to $$t_2 = \frac{(r_2 - r_1)}{100} \cdot t_1 + r_1 \quad (4)$$

wherein variables $r_1$ and $r_2$ are respectively a first knee and a second knee of the cumulative histogram. The first knee $r_1$ represents an inflection point in the cumulative histogram C where a curve of the cumulative histogram C first begins to increase or rise significantly above an initial value. The second knee $r_2$ represents an inflection point in the cumulative histogram C where the curve begins to reach a plateau. In some embodiments, the first and second knees $r_1$ and $r_2$ may be determined according to $$r_1 = \text{argmax}_j \left( C_j \,\Big|\, C_j \leq \frac{s_1}{100} \right) \quad (5)$$

$$r_2 = \text{argmin}_j \left( C_j \,\Big|\, C_j \geq \frac{s_2}{100} \right) \quad (6)$$

The computed value of the second threshold $t_2$ is then used as the determined 112c binarization threshold.

Referring back to FIG. 2, in some embodiments, the chosen 112 binarization threshold $t_2$ is employed 114 by comparing the value of each pixel $G_i$ in grayscale image to the binarization threshold $t_2$. If the pixel value $G_i$ is less than the binarization threshold $t_2$, then a corresponding pixel in the binary image is assigned a value of 1. Otherwise, the corresponding pixel is assigned a value of 0. Thus, the binarization threshold $t_2$ is employed 114 according to $$G_i^I = \begin{cases} 1, & G_i < t_2 \\ 0, & \text{otherwise} \end{cases} \quad (7)$$

where $G_i^I$ is a value of the i-th corresponding pixel in the binary image.

Referring again to FIG. 1, the method 100 of image binarization further comprises generating 120 an edge enhanced binary image from the grayscale image. The edge enhanced binary image emphasizes edges within the grayscale image. Essentially any of number of edge detecting operators may be employed to generate 120 the edge enhanced binary image including, but not limited to, gradient operators, compass operators and Laplace operators. The edge detection operator is used as an edge enhancing filter to filter the grayscale image. The filtered image is then converted into a binary image using a threshold, for example.

Figure 4:
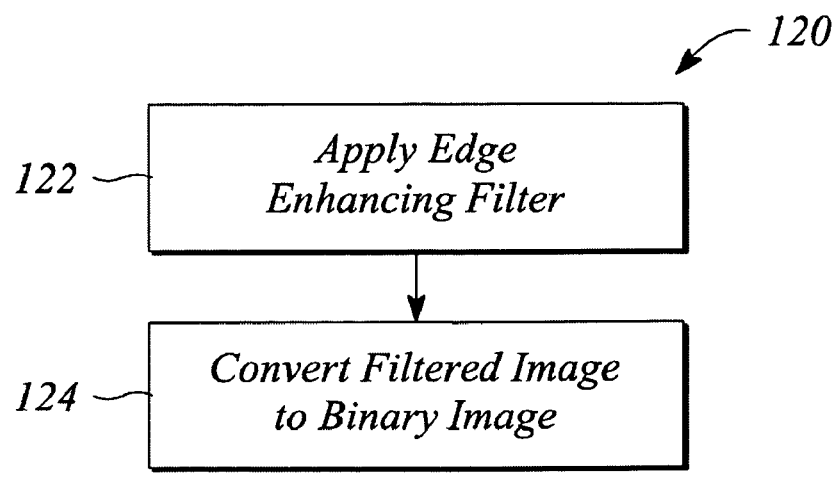
FIG. 4 illustrates a flow chart of generating an edge enhanced binary image of FIG. 1, according to an embodiment of the present invention.

FIG. 4 illustrates a flow chart of generating 120 an edge enhanced binary image of the method 100, according to an embodiment of the present invention. As illustrated, generating 120 comprises applying 122 an edge enhancing filter to the grayscale image. Applying 122 an edge enhancing filter produces a filtered image. As discussed above, essentially any image filter that enhances edges may be employed in applying 122 an edge enhancing filter.

In particular, applying 122 an edge enhancing filter may comprise using a Laplacian-based edge enhancing filter, in some embodiments. The Laplacian-based edge enhancing filter may employ a Laplace operator represented by a modified Laplacian kernel to filter the grayscale image G and produce a filtered image $G^{II}$, for example. Equation (8) represents an exemplary modified 5×5 Laplacian kernel mlap5×5.

$$mlap5 \times 5 = \begin{bmatrix} -1 & -2 & -2 & -2 & -1 \\ -2 & 2 & 4 & 2 & -2 \\ -2 & 4 & 8 & 4 & -2 \\ -2 & 2 & 4 & 2 & -2 \\ -1 & -2 & -2 & -2 & -1 \end{bmatrix} \quad (8)$$

The modified 5×5 Laplacian kernel mlap5×5 may be applied 122 according to $$G^{II} = G * mlap5 \times 5 \quad (9)$$

where the modified 5×5 Laplacian kernel mlap5×5 is applied 122 to the grayscale image G as represented by a 2D array.

Generating 120 an edge enhanced binary image further comprises converting 124 the filtered image into a binary image. Converting 124 the filtered image produces the edge enhanced binary image. In some embodiments, converting 124 the filtered image comprises applying a third threshold $t_3$. The third threshold $t_3$ may be arbitrarily determined, for example. As with the other thresholds, the third threshold $t_3$ is typically bounded by the bit depth b of the grayscale image (e.g., $0 \leq t_3 \leq 2^b - 1$). For example, the third threshold $t_3$ may be applied according to $$G_i^{III} = \begin{cases} 1, & G_i^{II} < t_3 \\ 0, & \text{otherwise} \end{cases} \quad (10)$$

where $G_i^{II}$ is a value of an i-th pixel in the filtered image $G^{II}$, and where $G_i^{III}$ is a value of a corresponding i-th pixel of the edge enhanced binary image $G^{III}$. An exemplary value of the third threshold is $t_3 = 250$.

Referring back to FIG. 1, the method 100 of image binarization further comprises combining 130 the solid fills binary image and the edge enhanced binary image. Combining 130 the images produces a composite binary image. In some embodiments, combining 130 the solid fills binary image and the edge enhanced binary image comprises performing a pixel-by-pixel logical OR of the pixels in the solid fills binary image and corresponding pixels in the edge enhanced binary image. Using the notation above, the pixel-by-pixel logical OR may be performed according to $$G_i^{IV} = G_i^{II} U G_i^{III} \quad (11)$$

where $G_i^{IV}$ is a value of an i-th pixel of the composite binary image $G^{IV}$ and the operator U is a bit-wise logical OR. Typically, the pixel-by-pixel logical OR is performed for all i pixels in the binary images $G_i^{II}$, $G_i^{III}$.

The method 100 of image binarization further comprises providing 140 the composite binary image as an output binary image. The output binary image is one or more of stored in a memory, displayed to a user, passed to another image processing operation and transmitted over a communication channel. For example, the provided 140 output binary image may be temporarily stored in memory and then transmitted over a telephone line in the form of a facsimile transmission.

In some embodiments, the method 100 of image binarization further comprises filtering the composite binary image to reduce speckle noise prior to providing the composite binary image as the output binary image (not illustrated). For example, a heuristic technique for salt and pepper speckle noise reduction may be employed in filtering the composite binary image. An exemplary heuristic technique for speckle noise reduction may be provided for a selected pixel $G_{p,q}^{IV}$ of the composite image $G^{IV}$ by summing together surrounding or neighboring pixels to produce a summation $S_{p,q}$ according to $$S_{p,q} = G_{p-1,q-1}^{IV} + G_{p-1,q}^{IV} + G_{p-1,q+1}^{IV} + G_{p,q-1}^{IV} + G_{p+1,q-1}^{IV} + G_{p+1,q}^{IV} + G_{p+1,q+1}^{IV} \quad (12)$$

Filtering the composite image $G^{IV}$ then employs the summation $S_{p,q}$ according to $$G_{p,q}^{V} = \begin{cases} 1, & (S_{p,q} \equiv 8) I(G_{p,q}^{IV} \equiv 0) \\ 0, & (S_{p,q} \equiv 0) I(G_{p,q}^{IV} \equiv 1) \\ G_{p,q}^{IV}, & \text{otherwise} \end{cases} \quad (13)$$

where $G_{p,q}{}^V$ is a value of a 'p,q' pixel of the filtered composite binary image $G^V$ and I is an operator that represents logical AND.

An implementation of the method 100 of image binarization using equations (1) through (13) may employ only two 'processing passes' over the pixel array that makes up the grayscale image. For example, a first processing pass may compile the cumulative histogram and yield the second threshold $t_2$. A second processing pass may then be used to generate the binary images $G^I$ through $G^V$ by using a parallel pipeline, for example.

Implementations of the method 100 of image binarization may compare favorably to other conventional methods of image binarization according to various embodiments. In particular, the method 100 of image binarization generally reproduces well-defined text/lines and good natural scenes in the output binary image. The method 100 of image binarization does not require training on a sample image(s) as may be necessary in other methods. Moreover, as noted above, an implementation of the method 100 of image binarization may require only two processing passes over the grayscale image and the processing employed is consistent with general purpose and simple processors currently available.

Figure 5:
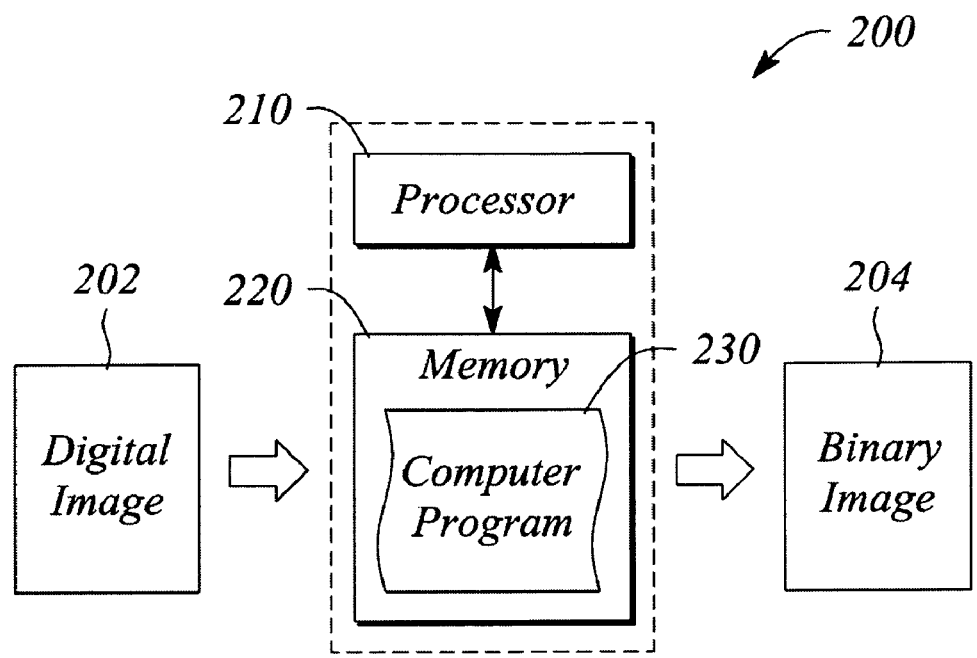
FIG. 5 illustrates a block diagram of an image processing system, according to an embodiment of the present invention.

FIG. 5 illustrates a block diagram of an image processing system 200, according to an embodiment of the present invention. The image processing system 200 converts a grayscale image 202 into a binary image 204. The image processing system 200 may be a stand-alone system for image processing or an embedded image processing system in another device or system. For example, the image processing system 200 may be a processing engine in an image scanner or a facsimile (FAX) machine. The processing engine receives the grayscale image 202 from another portion of the image scanner or FAX machine (e.g., the scanning engine) and produces the binary image 204 therefrom. In another example, the image processing system 200 may be a software application (e.g., image processing program) hosted on a personal computer (PC). In yet another example, the image processing system 200 may be a portion of an image processing integrated circuit (IC) and implemented as firmware or hardware within the IC.

The image processing system 200 comprises a processor 210. In some embodiments, the processor 210 comprises a general purpose processor such as, but not limited to, a central processing unit (CPU) or general purpose microprocessor. In other embodiments, the processor 210 is a special purpose processor such as, but not limited to, an image processor. The image processing system 200 further comprises a memory 220. The memory 220 may comprise one or more of random access memory (RAM), read only memory (ROM), magnetic memory (e.g., computer hard disk), or optical memory (e.g., CD, DVD, etc.).

The image processing system 200 further comprises a computer program 230 stored in the memory 220 and executed by the processor 210. The computer program 230 comprises instructions that, when executed by the processor 210, implement generating a solid fills binary image from the grayscale image 202, generating an edge enhanced binary image from the grayscale image 202, and combining the solid fills binary image and the edge enhanced binary image to produce a composite binary image. In some embodiments, instructions of the computer program 230 that implement combining the images do so by implementing performing a pixel-by-pixel logical OR of pixels in the solid fills binary image and corresponding pixels in the edge enhanced binary image. In some embodiments, the composite binary image is output as the binary image 204. In some embodiments, the computer program 230 further comprises instructions that implement speckle noise filtering of the composite binary image prior to outputting the binary image 204. In some embodiments, the instructions of the computer program 230 essentially implement the method 100 of image binarization described above.

In some embodiments, the computer program 230 of the image processing system 200 further comprises instructions that implement one or more of storing the composite binary image (or binary image 204) in the memory, displaying the composite binary image to a user, further processing the composite binary image, and transmitting the composite binary image over a communication channel. In some embodiments (not illustrated), the image processing system 200 further comprises a scanner or scanning engine that produces the grayscale image 202 from an image source having mixed content type, where the grayscale image 202 is used to produce the composite binary image (i.e., the binary image 204).

Figure 6:
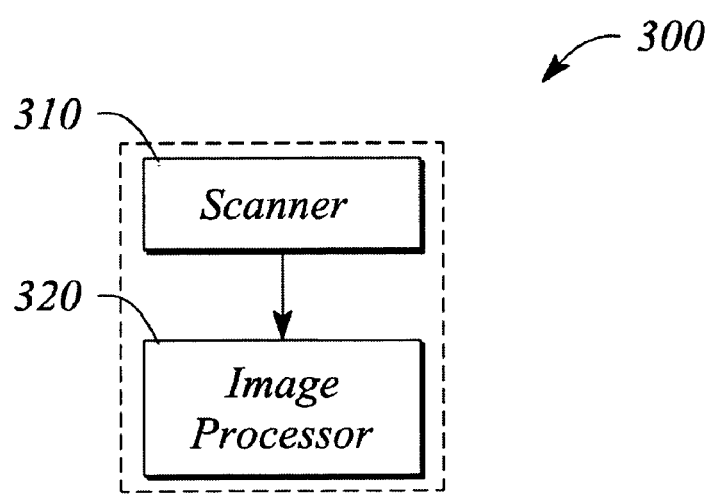
FIG. 6 illustrates a block diagram of a scanning system, according to an embodiment of the present invention.

FIG. 6 illustrates a block diagram of a scanning system 300, according to an embodiment of the present invention. The scanning system 300 comprises a scanner 310. The scanner 310 scans an image source to produce a grayscale image. The image source may be a page from a document, for example. In some embodiments, the scanner 310 is a component of a multifunction printer or a FAX machine.

The scanning system 300 further comprises an image processor 320. The image processor 320 processes the grayscale image produced by the scanner 310. In some embodiments, the image processor 320 comprises a computer program having instructions that, when executed, implement generating a solid fills binary image from the grayscale image, generating an edge enhanced binary image from the grayscale image, combining the solid fills binary image and the edge enhanced binary image to produce a composite binary image, and speckle noise reduction filtering of the composite binary image. In some embodiments, combining the images implemented by the executed instructions comprises performing a pixel-by-pixel logical OR of pixels in the solid fills binary image and corresponding pixels in the edge enhanced binary image.

In some embodiments, the instructions of the computer program in the image processor 320 essentially implement the method 100 of image binarization described above. In particular, in some embodiments, instructions that implement generating a solid fills image comprise instructions that implement choosing a binarization threshold and employing the binarization threshold to convert the grayscale image into the solid fills binary image. In some embodiments, instructions that implement generating an edge enhanced binary image comprise instructions that implement applying an edge enhancing filter to the grayscale image to produce a filtered image and converting the filtered image into a binary image to produce the edge enhanced binary image.

Thus, there have been described embodiments of a method of image binarization, an image binarization system, and a scanning system that provide edge enhanced image binarization. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. A method of image binarization, the method comprising:
generating a solid fills binary image from a grayscale image, generating a solid fills binary image comprising determining a binarization threshold from a cumulative image histogram generated from the grayscale image;
generating an edge enhanced binary image from the grayscale image;
combining the solid fills binary image and the edge enhanced binary image to produce a composite binary image, and
providing the composite binary image as an output binary image,
wherein the output binary image is one or more of stored in a memory, displayed to a user, passed to an image processing operation and transmitted over a communication channel.

2. The method of claim 1, further comprising filtering the composite binary image to reduce speckle noise prior to providing the composite binary image as the output binary image.

3. The method of claim 1, wherein combining the solid fills binary image and the edge enhanced binary image comprises performing a pixel-by-pixel logical OR of pixels in the solid fills binary image and corresponding pixels in the edge enhanced binary image.

4. The method of claim 1, wherein generating a solid fills binary image further comprises employing the binarization threshold determined from the cumulative image histogram to convert the grayscale image into a binary image, the binary image being the solid fills binary image.

5. The method of claim 1, further comprising:
generating the cumulative image histogram from an image histogram of the grayscale image; and
using a black clipping percentile, a white clipping percentile and a threshold percentile in determining the binarization threshold from the cumulative image histogram,
wherein each of the percentiles is an arbitrarily chosen value greater than or equal to zero and less than or equal to one hundred.

6. The method of claim 1, wherein determining the binarization threshold from the cumulative image histogram comprises:
computing a threshold value $t_2$ according to:

$$t_2 = \frac{(r_2 - r_1)}{100} \cdot t_1 + r_1,$$

wherein $t_1$ is a threshold percentile and variables $r_1$ and $r_2$ are respective knees of the cumulative histogram determined according to:

$$r_1 = \mathrm{argmax}_j \left( C_j \,\middle|\, C_j \leq \frac{s_1}{100} \right)$$

$$r_2 = \mathrm{argmin}_j \left( C_j \,\middle|\, C_j \geq \frac{s_2}{100} \right)$$

wherein $s_1$ is a black clipping percentile, $s_2$ is a white clipping percentile and $C_j$ is an array representing the cumulative image histogram, the array being indexed on an integer j; and
using the threshold value $t_2$ as the binarization threshold.

7. The method of claim 1, wherein generating an edge enhanced binary image comprises:
applying an edge enhancing filter to the grayscale image to produce a filtered image; and
converting the filtered image into a binary image to produce the edge enhanced binary image.

8. The method of claim 7, wherein applying an edge enhancing filter comprises applying a Laplacian filter.

9. The method of claim 8, wherein the Laplacian filter comprises a modified 5×5 Laplacian kernel given by:

$$\begin{bmatrix} -1 & -2 & -2 & -2 & -1 \\ -2 & 2 & 4 & 2 & -2 \\ -2 & 4 & 8 & 4 & -2 \\ -2 & 2 & 4 & 2 & -2 \\ -1 & -2 & -2 & -2 & -1 \end{bmatrix}.$$

10. The method of claim 1, wherein the grayscale image comprises mixed content comprising text content and photographic content.

11. The method of claim 1 employed in an image processing system comprising a processor and a memory, wherein the method is implemented as instructions of a computer program that is stored in the memory and executed by the processor.

12. An image processing system that produces a binary image from a grayscale image, the system comprising:
a processor;
a memory; and
a computer program stored in the memory and executed by the processor, the computer program comprising instructions that, when executed by the processor, implement generating a solid fills binary image from the grayscale image, generating an edge enhanced binary image from the grayscale image, and combining the solid fills binary image and the edge enhanced binary image to produce a composite binary image,
wherein generating a solid fills binary image comprises determining a binarization threshold from a cumulative image histogram generated from an image histogram of the grayscale image and using the determined binarization threshold in generating the solid fills binary image.

13. The image processing system of claim 12, wherein the computer program of the image processing system further comprises instructions that implement one or more of storing the composite binary image in the memory, displaying the composite binary image to a user, further processing the composite binary image, and transmitting the composite binary image over a communication channel.

14. The image processing system of claim 12, further comprising a scanner that produces the grayscale image from an image source having mixed content type, the grayscale image being used to produce the composite binary image.

15. The image processing system of claim 12, wherein the computer program further comprises instructions that implement speckle noise filtering of the composite binary image.

16. The image processing system of claim 12, wherein the instructions of the computer program that implement combining the solid fills binary image and the edge enhanced binary image comprise instructions that implement performing a pixel-by-pixel logical OR of pixels in the solid fills binary image and corresponding pixels in the edge enhanced binary image.

17. The image processing system of claim 12, wherein the instructions that implement generating a solid fills image comprise instructions that implement employing the binarization threshold to convert the grayscale image into a binary image, the binary image being the solid fills binary image, and wherein the instructions that implement generating an edge enhanced binary image comprise instructions that implement both applying an edge enhancing filter to the grayscale image to produce a filtered image and converting the filtered image into a binary image to produce the edge enhanced binary image.

18. A scanning system comprising:
 a scanner that scans an image source to produce a grayscale image; and
 an image processor that processes the grayscale image, the image processor comprising a computer program having instructions that, when executed, implement generating a solid fills binary image from the grayscale image using a binarization threshold determined from a cumulative image histogram generated from the grayscale image, generating an edge enhanced binary image from the grayscale image, combining the solid fills binary image and the edge enhanced binary image to produce a composite binary image, and speckle noise reduction filtering of the composite binary image,
 wherein combining the generated binary images comprises performing a pixel-by-pixel logical OR of pixels in the solid fills binary image and corresponding pixels in the edge enhanced binary image.

19. The scanning system of claim 18, wherein the instructions that implement generating a solid fills image comprise instructions that implement employing the binarization threshold to convert the grayscale image into the solid fills binary image, and wherein the instructions that implement generating an edge enhanced binary image comprise instructions that implement both applying an edge enhancing filter to the grayscale image to produce a filtered image and converting the filtered image into a binary image to produce the edge enhanced binary image.

20. The scanning system of claim 19, wherein the instructions that implement applying an edge enhancing filter comprise instructions that implement applying a Laplacian filter having a kernel given by:

$$\begin{bmatrix} -1 & -2 & -2 & -2 & -1 \\ -2 & 2 & 4 & 2 & -2 \\ -2 & 4 & 8 & 4 & -2 \\ -2 & 2 & 4 & 2 & -2 \\ -1 & -2 & -2 & -2 & -1 \end{bmatrix}.$$

\* \* \* \* \*